Patented July 18, 1939

2,166,261

UNITED STATES PATENT OFFICE 2,166,261

PROCESS OF COATING AND PRODUCT THEREOF

William Henry Moss, London, England, assignor to Celanese Corporation of America, a corporation of Delaware No Drawing. Application December 16, 1931, Serial No. 581,528. In Canada September 21, 1928

6 Claims. (Cl. 91—68)

This invention relates to the method of applying lacquer containing organic derivatives of cellulose to metallic, wood, or other smooth surfaces.

This application is a continuation in part of my application No. 225,857 filed October 12, 1927.

An object of this invention is to provide a method of applying lacquer or solutions containing organic derivatives of cellulose, and particularly cellulose acetate to metallic surfaces, which lacquer on drying leaves clear, hard, firmly adhering and light-fast films. Other objects of my invention will appear from the following detailed description.

While the advantages of lacquer containing organic derivatives of cellulose and particularly cellulose acetate as the sole cellulose derivative constituent of the lacquer base have been long recognized, their application on smooth surfaces such as metal, glass or hardwood has heretofore been impractical because of the fact that when such lacquers are applied to smooth surfaces, the film formed on drying does not adhere to such surfaces and is therefore easily peeled off.

I have found that while lacquer containing an organic derivative of cellulose, such as cellulose acetate, as substantially the only cellulose derivative constituent of the lacquer base cannot be used to produce a film that adheres to hard, smooth surfaces, such lacquer may be applied to a film formed from a lacquer containing nitrocellulose as the sole cellulose derivative of base.

In accordance with my invention, the hard, smooth surface such as iron, glass or hardwood is first coated with a lacquer containing nitrocellulose as the sole cellulose derivative constituent of the lacquer base. This nitro-cellulose lacquer may be applied directly to the raw, smooth surface or it may be applied over an ordinary primer coat. The nitrocellulose lacquer may be a clear lacquer or it may have any desired pigments incorporated therein. One or more coats of this nitrocellulose lacquer may be applied to the surface. After the nitrocellulose lacquer film has just dried to the touch; i. e. lost its most volatile solvents one, two, three or more coats of a lacquer containing organic derivatives of cellulose as the sole cellulose derivative constituent of the lacquer base are applied. By organic derivatives of cellulose is meant organic esters of cellulose such as cellulose formate, cellulose acetate, cellulose butyrate, cellulose propionate or cellulose ethers such as methyl cellulose, ethyl cellulose, benzyl cellulose. This lacquer containing the organic derivatives of cellulose may be clear or it may contain any desired pigment. Obviously it contains suitable solvents and plasticizers.

The lacquer containing the organic derivatives of cellulose as the sole cellulose derivative of its base may be applied in any suitable manner, such as by spraying, brushing, flowing, dipping, etc.

In order to further elucidate my invention the following specific examples of carrying out my invention are given. A lacquer containing nitrocellulose as the sole cellulose derivative constituent of its base containing pigments to give it a green color is diluted with solvents to spraying viscosity and sprayed onto a metallic surface that has previously been coated with a primer containing linseed oil, turpentine, resin and pigment. Two or three coats of this nitrocellulose lacquer are applied although only one coat may be used. Each coat is dried for three minutes at 90° F. before applying the next. One or more top coats of lacquer containing cellulose acetate as the sole cellulose derivative constituent thereof are then sprayed directly over the nitrocellulose coat and dried for 20 minutes at 140° F. A typical cellulose acetate lacquer that is useful for this purpose is constituted as follows:

| | |
|---|---|
| Cellulose acetate | kilograms__ 10 |
| Diethyl phthalate | do____ 2 |
| Volatile solvent | liters__ 100 |
| Ethyl lactate | do____ 20 |

The volatile solvent is made up as follows:

| | |
|---|---|
| Acetone | parts by volume__ 50 |
| Alcohol | do____ 22 |
| Benzene | do____ 28 |

The cellulose acetate may have any desired viscosity characteristics. I have found that cellulose acetate producing low viscosity solutions are very desirable. I have used cellulose acetate of 0.5 to 3.0 viscosity as determined by the test set forth in specification D—50 of the British Engineering Standards with very satisfactory results.

While as above stated, the number of coats of the nitrocellulose lacquer and cellulose acetate lacquer may be varied at will, I have found it preferable to have the number of cellulose acetate lacquer coats or rather the thickness of the cellulose acetate lacquer film less than the number of coats of the nitrocellulose lacquer or the thickness of the nitrocellulose film. When the relative number of coats of the two lacquers are discussed, it is obvious that they are of comparatively the same thickness. Thus if one coat of a nitrocellulose lacquer film of .004 cm. thickness is applied, two or three coats of cellulose acetate films each .001 cm. thick or else one coat .002 cm. of cellulose acetate lacquer may be applied. I have found it preferable not to allow the proportion of cellulose acetate in the built-up film to become more than ½ to ⅔ that of the nitrocellulose lacquer film.

The cellulose acetate lacquer, upon drying gives a clear film without blushing that sticks well to the undercoat film of nitrocellulose lacquer, the two films being indistinguishable. The resulting film has a very high gloss. The cellulose acetate film meets the highest requirements of adhesion, hardness, toughness, etc. When exposed to a fadeometer for over 125 hours, it does not show any change of color. After drying for 24 hours at room temperature, the cellulose acetate films show no substantial deleterious effects when immersed in water for 48 hours. The film produced in accordance with my invention is so smooth and even, that no polishing or further finishing is necessary. In proceeding in accordance with my invention, no sandpapering or polishing of any of the coats of lacquer, even of the coats containing nitrocellulose, is necessary, thus entailing an enormous saving of time and labor. Furthermore, the top coat or coats of lacquer containing the organic derivatives of cellulose protect the nitrocellulose coat against the deleterious action of the elements, particularly of light rays.

It is to be understood that the foregoing specific description is given merely by way of illustration and that many variations may be made therein without departing from the spirit of the invention. Obviously the proportions of ingredients may be varied within large limits in order to meet the particular requirements of the use to which the lacquer is to be put. Furthermore, the number of coats of the nitrocellulose lacquer and of the cellulose acetate lacquer that are applied may be varied at will. Any suitable plasticiser such as triacetin, tricresyl phosphate, triphenyl phosphate may be used instead of diethyl phthalate as the plasticiser. Likewise, any desirable low boiling solvent may be used. Furthermore, instead of ethyl lactate other high boilers such as diacetone alcohol, tetrachlor ethane, benzyl alcohol may be employed.

Having described my invention what I claim and desire to secure by Letters Patent is:

1. Process of coating metallic surfaces comprising first applying to said surfaces a coating composition containing cellulose nitrate as the sole cellulose derivative constituent thereof and then applying directly to the film formed thereby a coating composition containing an organic derivative of cellulose as the sole cellulose derivative constituent thereof.

2. Process of coating metallic surfaces comprising first applying to said surfaces a coating composition containing cellulose nitrate as the sole cellulose derivative constituent thereof and then applying directly to the film formed thereby a coating composition containing cellulose acetate as the sole cellulose derivative constituent thereof.

3. Process of coating metallic surfaces comprising first applying to said surfaces a coating composition containing cellulose nitrate as the sole cellulose derivative constituent thereof and then as soon as the film formed thereby is just dry to the touch applying directly to said film a coating composition containing an organic derivative of cellulose as the sole cellulose derivative constituent thereof.

4. Process of coating metallic surfaces comprising first applying to said surfaces a coating composition containing cellulose nitrate as the sole cellulose derivative constituent thereof and then as soon as the film formed thereby is just dry to the touch applying directly to said film a coating composition containing cellulose acetate as the sole cellulose derivative constituent thereof.

5. An article having a metallic surface coated with a film containing cellulose nitrate as the sole cellulose derivative constituent thereof and a coating of a composition containing an organic derivative of cellulose as the sole cellulose derivative constituent directly on said film.

6. An article having a metallic surface coated with a film containing cellulose nitrate as the sole cellulose derivative constituent thereof and a coating of a composition containing cellulose acetate as the sole cellulose derivative constituent directly on said film.

WILLIAM HENRY MOSS.